United States Patent [19]

Dicke

[11] 4,028,571
[45] June 7, 1977

[54] CONTROL MECHANISM FOR REMOTELY MOUNTED MOTOR

[75] Inventor: Paul A. Dicke, New Bremen, Ohio

[73] Assignee: Crown Controls Corporation, New Bremen, Ohio

[22] Filed: Feb. 25, 1976

[21] Appl. No.: 661,319

[52] U.S. Cl. .................................... 310/89; 310/43
[51] Int. Cl.[2] .......................................... H02K 5/04
[58] Field of Search ................. 318/41; 310/89, 43

[56] References Cited

UNITED STATES PATENTS

| | | | |
|---|---|---|---|
| 3,102,218 | 8/1963 | Dicke | 318/41 |
| 3,121,813 | 2/1964 | Pratt et al. | 310/43 X |
| 3,467,843 | 9/1969 | Dailey | 310/89 X |
| 3,622,822 | 11/1971 | Lofstrand | 310/89 |
| 3,729,912 | 5/1973 | Weber | 310/89 X |
| 3,760,209 | 9/1973 | Hult | 310/89 X |

Primary Examiner—Donovan F. Duggan
Attorney, Agent, or Firm—Biebel, French & Nauman

[57] ABSTRACT

A control mechanism for a remotely mounted motor, such as an antenna rotator, is contained within a molded housing having a cover and base, and includes an indicator motor which rotates a switch assembly to a preselected location. The indicator motor is secured by a motor housing integrally molded in the housing base and a polyurethane pad cushions the motor. The motor housing includes side wall members and a cover attached thereto by an integrally molded hinge member on one side wall, and fastening means on the other side walls secures the cover and the motor within the housing.

9 Claims, 6 Drawing Figures

U.S. Patent
June 7, 1977
4,028,571
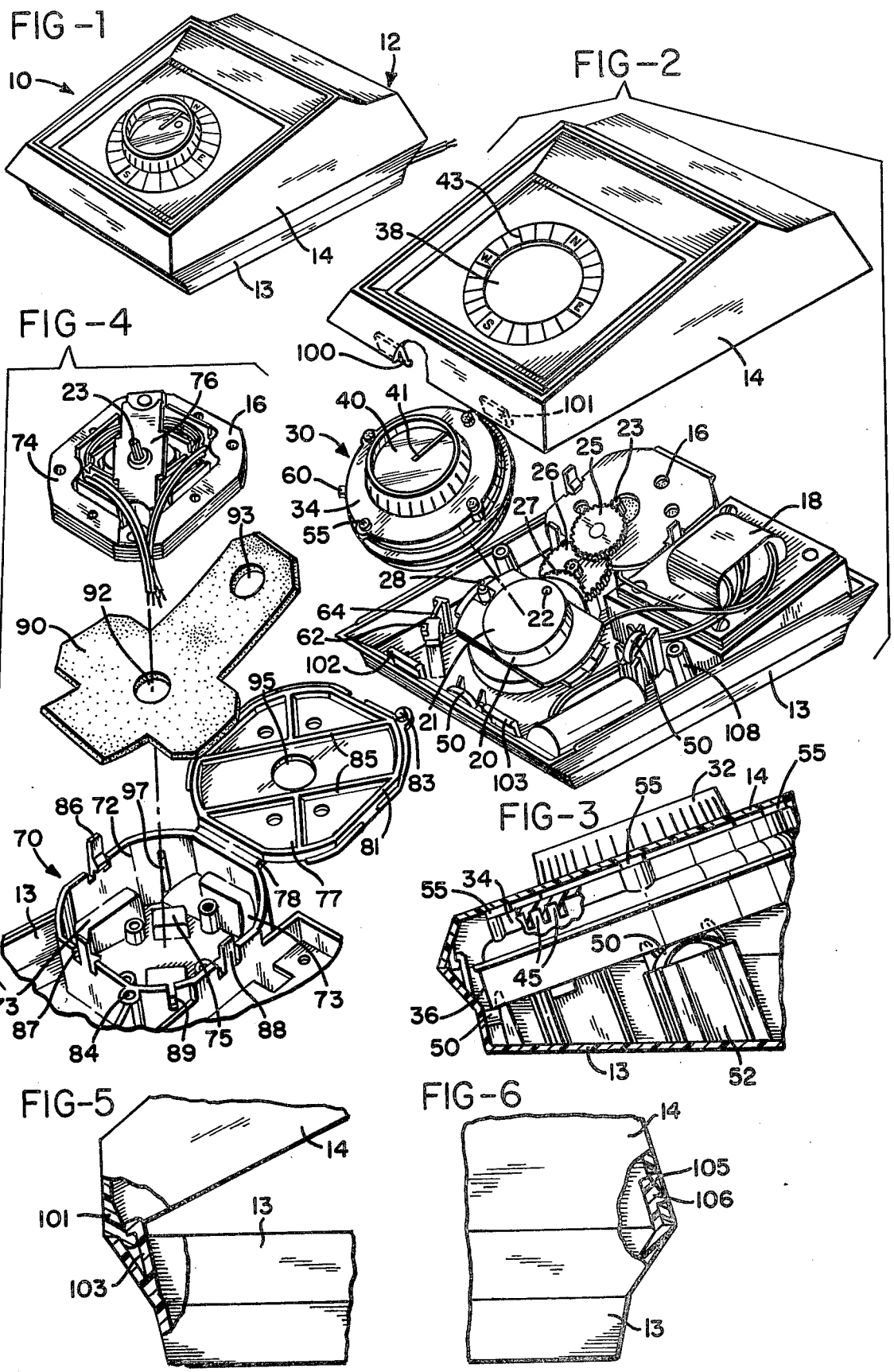

CONTROL MECHANISM FOR REMOTELY MOUNTED MOTOR

BACKGROUND OF THE INVENTION

This invention relates to a control mechanism for a remotely mounted motor, such as an antenna rotator.

The present invention is an improvement of the control mechanism shown and described in U.S. Pat. No. 3,102,218, issued Aug. 27, 1963. That Patent discloses a control mechanism including an indicator motor, an indicator dial rotatable by the motor, a switch mechanism, and a dial assembly for operating the switch mechanism to control the direction of rotation of the indicator motor all contained within a housing.

The switch mechanism can assume one of three positions: a neutral position where the switch is off, a clockwise position which causes the indicator motor to rotate in a clockwise direction, and a counterclockwise position to cause the motor to rotate in a counterclockwise direction. The dial assembly includes a cam mechanism having two concentric cam surfaces, one having a larger diameter than the other. A cam follower associated with the cam surfaces operates the switch mechanism. When the dial is rotated clockwise, the cam mechanism moves the switch mechanism to cause the indicator motor also to move clockwise. When the indicator motor reaches the position set by the dial assembly, the cam follower moves the switch to the neutral position and the indicator motor stops.

An antenna rotator motor is connected in parallel and rotates simultaneously with the indicator motor, and therefore the antenna will assume the position indicated by the dial mechanism.

SUMMARY OF THE INVENTION

This invention relates to a control mechanism of the type described including an improved housing, a manually positionable dial assembly, and mounting means for the indicator motor.

The present invention includes a molded housing, preferably of polypropylene, formed in two sections, a base and a cover. The first section or base includes an integrally molded motor housing preferably including upwardly extending side walls for orienting and holding the indicator motor in place, interior bosses for supporting the weight of the motor and a motor housing cover which may be hinged to and formed integral with the motor housing and which includes an opening through which the motor shaft extends. Fastening means, such as hooks, are integrally formed in the side walls to secure the cover against the side walls and thereby hold the motor in place. As elastomeric pad, such as polyurethane, may be placed between the motor and the housing to provide cushioning, and excursion limiting means are included on each radium corner within the housing to limit the travel of the motor should the housing be subjected to shocks. The base also includes other integrally molded parts to hold various other components which comprise the control mechanism.

The elastomeric member not only provides cushioning and support for the motor, but also reduces radiated audible noise because of its sound absorbent characteristics and reduces the direct transmission of sound and vibration to the base, thus providing a device which is quiet in its operation.

The cover includes an opening through which a part of the manually positionable dial assembly extends and has on the exterior thereof a plate for indicating direction. The interior of the cover includes a pair of integrally formed partial hinge members which cooperate with complementary partial hinge members molded into and integral with the base. The cover and the base are therefore locked together by the hinge on one end thereof, and fastening means, such as hooks, are employed at the other end thereof to secure the cover in place, thus facilitating assembly of the housing.

In the present invention, the manually positionable dial assembly is integrally formed from a single member and includes a knob, a lateral surface and a skirt. The knob is designed to extend through the opening formed in the housing cover and has a hollow interior into which the indicator dial may be placed. The upper surface of the knob is transparent so that the indicator dial may be viewed therethrough and compared with a reference mark painted or inscribed on the knob and the direction indications or markings on the cover. The lateral surface is provided with concentric cam grooves on its lower part which cooperate with the cam follower associated with the switch mechanism to control the operation of the motor. Mounted within the base are spring means which engage the skirt to urge the dial upwardly toward the cover. A plurality of friction pads are positioned between the upper part of the lateral surface and the cover to provide resistance to rotation of the dial assembly as the motor rotates the switch means. The frictional forces provided by the pads may be reduced when the dial assembly is pressed downwardly against the spring means such as when it is desired to manually reposition the dial and select a new direction for the exteriorly mounted antenna.

The features and advantages described above therefore provide a simpler, less expensive housing, one in which the various components are easily installed and assembled, and which therefore results in reduced manufacturing costs.

Accordingly, it is an object of this invention to provide a control mechanism for a remotely mounted motor, such as an antenna rotator, having an improved housing design of the type described, and more specifically, a housing including mounting means integrally formed in a base member for supporting an indicator motor in a conformal chamber by a resilient support to provide cushioning and sound absorption, a manually positionable dial assembly formed from a single transparent member, and a cover member which may be hinged and secured to the base of the housing without requiring external fastening means.

Other objects and advantages of the invention will be apparent from the following description, the accompanying drawings and the appended claims.

BRIEF DESCRIPTION OF THE DRAWINGS

FIG. 1 is a perspective view showing a housing for a control mechanism for a remotely mounted motor, such as an antenna rotator;

FIG. 2 is a perspective, exploded view showing the housing cover, base and the various components which comprise the control mechanism;

FIG. 3 is a cross sectional view of the control mechanism illustrating the manually positionable dial;

FIG. 4 is a perspective, exploded view showing the motor support housing, foam cushion and motor;

FIG. 5 is an elevational view of one end of the housing, partly in cross section, showing the partial but complementary hinge components formed in the housing cover and base, with the hinge joined but prior to the housing cover being completely installed; and FIG. 6 is an elevational view of the other end of the housing, partly in cross section, showing the details of the means for latching the housing cover to the base.

DESCRIPTION OF THE PREFERRED EMBODIMENT

Referring now to the drawings, and particularly to FIGS. 1 and 2, the control mechanism for a remotely mounted motor, shown generally at 10, is contained within a housing 12 comprising a base member 13 and a cover 14. Mounted within the housing base are several major components including an indicator motor 16, a transformer 18, a switch assembly 20 including an indicator dial 21 having thereon a position indicating mark 22.

The motor 16 includes a geared shaft 23 which is connected through a gear train, including gears 25, 26 and 27, to rotate the switch assembly 20. The switch assembly includes a cam follower arm 28 which cooperates with cam grooves formed in a manually positionable dial assembly 30.

The dial assembly 30 is preferably made from an integrally formed transparent material and includes a knob 32, a lateral surface 34 and a skirt 36. The knob 32 extends upwardly through an opening 38 formed in the upper surface of the housing cover 14 and is accessible for manipulation by the operator. The knob includes a transparent, generally planar surface 40 on which is included a reference mark 41. The indicator dial 21 may therefore be viewed through the surface 40 and the reference mark 41 compared with the mark 22 on indicator dial 21. The azimuth ring 43 is included on the cover 14 to assist the operator in manually positioning the dial assembly 30.

The lateral surface 34 of the dial assembly includes cam grooves 45 (FIG. 3) on the interior part thereof which cooperate with the cam follower arm 28 on the switch means 20 to control the position of the switch and thus control the operation and direction of rotation of the motor 16.

The lower edge of the skirt 36 of the dial assembly 30 engages three curved springs 50 which are supported on generally equally spaced spring support members 52 integrally formed with the base member 13. These springs urge the lateral surface 34 of the dial assembly 30 toward the lower surface of the cover 14, as shown in FIG. 3. Positioned between the upper part of the lateral surface 34 and the lower surface of the cover 14 are a plurality of friction pads 55. These pads provide resistance to rotation of the dial assembly as the motor 16 repositions the switch assembly 20. The pads are secured to the dial assembly 30 in the embodiment shown in FIG. 2, but they could also be secured to the cover 14 and accomplish the same result.

The resistance to turning provided by the friction pads 15 may be reduced by pressing downwardly on the knob against the springs 50 which will move the pads 55 away from the cover 14. After the dial assembly is repositioned, it is released, and the frictional pads then provide the necessary resistance to turning as the motor rotates the switch assembly 20 and the cam follower 28 rotates to the new position determined by the position of the dial assembly.

To prevent the damage to the electrical leads extending from the switch assembly, rotation of the switch assembly is limited to approximately 360° of rotation by means of a tab 60 integrally formed with the dial assembly 30. This tab engages a stop member 62 slidably mounted on an arcuately shaped boss 64. The stop member 62 is allowed to move through an angle slightly larger than the angle subtended by the tab 60 thus allowing the dial assembly to be rotated 360° in either direction before its movement is arrested.

The motor 16 is not directly mounted to the base 13 but is preferably supported within a motor housing shown generally at 70 in FIG. 4. This motor housing is integrally molded within the base member 13 and includes side wall means 72 extending upwardly from the base having interior dimensions slightly larger than the exterior dimensions of the motor 16. Interior bosses 73 are positioned within the housing to support the weight of the motor and are designed to extend under the laminations 74 of the motor to provide proper vertical positioning; and shorter interior bosses 75 extend under the lower bearing bracket, not shown. Both the lower and upper bearing brackets 76 support the motor shaft and armature within the magnetic field created by windings which extend inwardly from the laminations 74.

The motor housing includes a cover member 77 integrally formed with the side walls 72 and connected thereto by a hinge means 78. The hinge means may be an integral part of the molded base 13 if it is formed from a suitable material, such as polypropylene.

The motor housing cover member 77 includes downwardly projecting ribs 81 which fit within the side walls 72 and an alignment pin 83 which mates with an alignment hole 84 to insure proper positioning of the cover member. The ribs 85 are aligned with the upper bearing bracket 76. Once the cover member 77 is closed, it is held in place by hooks 86, 87 and 88. Hook 86 is so positioned with respect to the interior wall of cover 14 that it cannot move outwardly to release the cover member 77 when the cover 14 is installed. The housing 70 is provided with an opening 89 for the electrical wires which supply power to the motor 16.

An elastomeric member 90 having a generally T shaped configuration is placed around the motor 16 before the motor is placed into the motor housing. The pad 90 includes openings 92 and 93 with the opening 93 being placed in alignment with the motor shaft 23 and, when the cover is closed, the opening 95 in the cover 16. The pad 90 may be made of polyurethane and provides a cushion between the motor and motor housing on all sides, top and bottom of the motor.

The elastomeric member 90 therefore encircles the motor and is positioned between the lamination 75 and the side wall and interior bosses 73 between the bearing brackets and the interior bosses 74 and cover member 77, to provide a cushioned support for the motor. Thus cushioned support not only reduces the radiation of audible noise due to its noise absorbent qualities but also isolates mechanically the motor from the housing and the base to prevent direct transmission of sound and vibration thereinto.

Also included within the housing 70 are four lands 97 on the radial interior corners, one of which is shown in FIG. 4. These lands are excursion limiters and are positioned adjacent the motor laminations not covered by the pad 90 due to its T-shaped configuration. Under normal centering conditions, the laminations 74 of the motor do not contact the lands; however, should the control mechanism be subject to excessive shocks, either by dropping or during shipment, the lands engage the laminations 74 to limit the distance through which the motor can move. This prevents the shaft supporting gear 25, on the gear itself, from being broken by excessive force applied thereto by the pinion 23. The gear 25 is preferably made from a flexible material, such as polyurethane.

The housing cover 14 is provided at its forward edge with two partial hinge members 100 and 101, as shown in FIG. 2, integrally formed with the cover. Similarly, the base 13 is provided with two partial and mating integrally formed hinge members 102 and 103. During assembly, the mating hinge members 100-103 are placed in their proper position, as shown in FIG. 5, and the cover is then rotated into place. The back of the cover 14 is provided with at least one aperture 105 which receives a hook 106 formed in the base 13. If desired, additional shipping screws may be inserted from beneath the housing and through bosses 108 to provide additional fastening strength to hold the cover 14 in place during shipment.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a control mechanism for a remotely mounted motor comprising a housing containing an indicator motor, an indicator dial rotatable by said motor, switch means, and a dial assembly for operating said switch means to control the direction of rotation of said motor, the improvement characterized by said housing including a base member and a cover, a motor housing integrally molded within said base member and including upwardly extending side wall means for orienting and holding said motor in place, interior bosses for supporting the weight of said motor and to position said motor vertically, a cover member for said motor housing including means therein defining an opening through which the shaft of said motor extends, and means for securing said motor housing cover member against said side wall means to hold said motor within said housing.

2. The control mechanism of claim 1 further including excursion limiting means within said motor housing on each radius corner for limiting the distance through which the motor can travel whenever said housing is subjected to shocks.

3. The control mechanism of claim 1 wherein said motor shaft is connected to said indicator dial and switch means through a series of gears wherein at least one of the gears revolves about a shaft integrally formed on said motor housing cover.

4. The control mechanism of claim 1 wherein said motor housing cover member is hinged to and integrally formed with one side wall means of said motor housing.

5. The control mechanism of claim 1 further including a pad positioned between said motor and said housing to provide a resilient and shock absorbing support for said motor.

6. In a control mechanism for a remotely mounted motor comprising a housing containing an indicator motor, an indicator dial rotatable by said motor, switch means, and a dial assembly for operating said switch means to control the direction of rotation of said motor, the improvement characterized by said dial assembly being integrally formed and positioned within said housing and including a knob, lateral surface and skirt, said knob extending upwardly through an opening formed in the upper surface of said housing and accessible for manipulation by an operator, said knob having a hollow interior into which said indicator dial may be placed, a transparent surface through which said indicator dial may be viewed, and a reference mark to assist the operator in positioning said dial assembly, said lateral surface including cam grooves which cooperate with said switch means to control the operation of said motor, a plurality of spring means engaging said skirt to urge the lateral surface of said dial assembly toward said housing, and a plurality of friction pads positioned between said lateral surface and said housing to provide resistance to rotation of said dial assembly as said motor rotates said switch means within said cam grooves, said frictional forces being reduced when said dial assembly is pressed downwardly against said spring means to assist in manually repositioning said dial assembly.

7. The control mechanism of claim 1 further including a polyurethane foam cushion positioned between said side wall means and said motor to provide a resilient and shock absorbing support.

8. In a control mechanism for a remotely mounted motor comprising a housing containing an indicator motor, an indicator dial rotatable by said motor, switch means, and a dial assembly for operating said switch means to control the direction of rotation of said motor, the improvement characterized by said housing including a base and a cover, said base including at least one partial hinge member located at one end thereof, said cover including means defining an opening therein through which a part of said dial assembly extends for manual positioning thereof, said cover further including at least one complementary partial hinge member located at one end thereof and so positioned with respect to said partial hinge member on said base as to form a complete hinge when said one end of both said base and cover are aligned;

means at the other end of both said base and said cover for securing said cover to said base after said hinge members have been engaged and said dial assembly has been positioned within said opening.

9. A mechanism comprising a housing containing a motor, said housing including a base member and a cover, a motor housing integrally molded within said base member and including upwardly extending side wall means for orienting and holding said motor in place, interior bosses for supporting the weight of said motor and to position said motor vertically, a cover member for said motor housing including means therein defining an opening through which the shaft of said motor extends, means for securing said motor housing cover member against said side wall means to hold said motor within said housing, and a pad positioned between said motor and said side walls, interior bosses and motor housing cover to provide a resilient and shock absorbing support for said motor and to minimize the radiation of audible noise and vibration from said motor to said base member.

* * * * *